Dec. 30, 1969    R. E. GAURA    3,486,517
BI-DIRECTIONAL FLUIDIC FLOW CONTROL VALVE
Filed Dec. 18, 1967
FIG_1
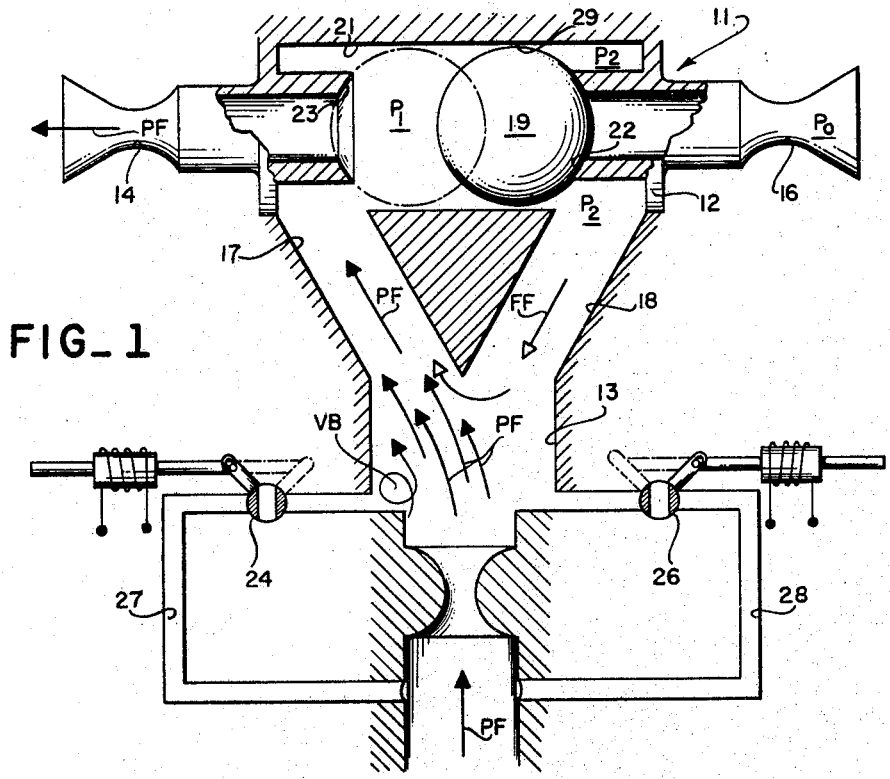
FIG_2
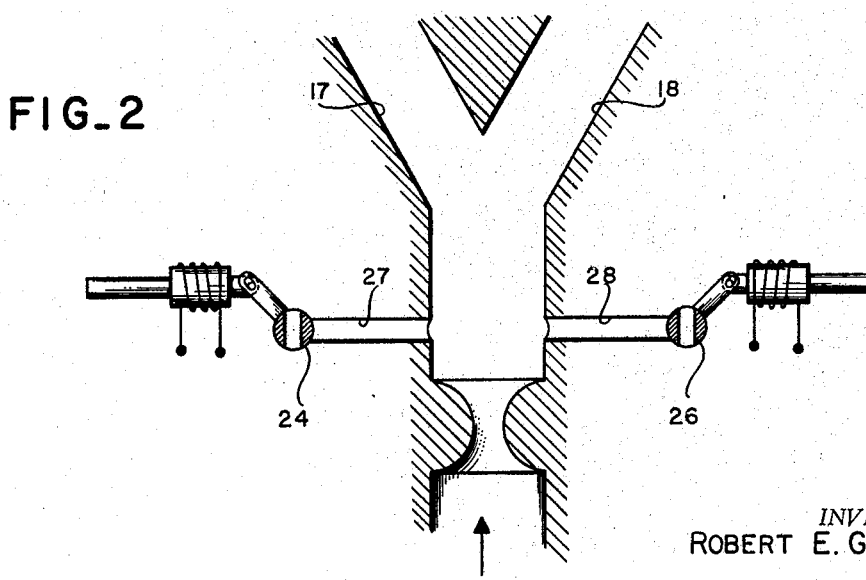
INVENTOR.
ROBERT E. GAURA
BY
George C. Sullivan
Agent

United States Patent Office 3,486,517
Patented Dec. 30, 1969

3,486,517
BI-DIRECTIONAL FLUIDIC FLOW CONTROL VALVE
Robert E. Gaura, San Jose, Calif., assignor to Lockheed Aircraft Corporation, Burbank, Calif.
Filed Dec. 18, 1967, Ser. No. 691,579
Int. Cl. F15c 1/08; F16k 15/04
U.S. Cl. 137—81.5           2 Claims

ABSTRACT OF THE DISCLOSURE

A bi-directional fluidic flow control valve includes a floating ball check valve which produces a positive seal for the off leg and provides feedback flow to improve stability of valve. This prevents low ambient pressure from reducing the off leg pressure to a level at which the flow stream could split between the on leg and the off leg.

---

This invention relates to a bi-directional fluidic flow control valve of the kind often referred to as a fluid amplifier. This invention relates particularly to a bi-directional fluidic flow control valve which is effective under ambient pressure conditions ranging from the normal pressure existing at sea level to the zero pressure existing in outer space.

Conventional bi-directional fluid flow control valves, or fluid amplifiers, include a primary flow conduit which divides into two branch conduits. Each branch conduit is connected to an output. The primary fluid flow is switched from one output to the other output by injecting a stream of high pressure fluid against the primary fluid flow to bend the primary flow in the direction desired. The characteristics of the flow then cause the flow to tend to remain in that branch, or leg. The mechanics of the fluid flow produce a low pressure vortex bubble on that side of the primary flow conduit which is closest to the branch conduit to which the flow has been deflected. Thus, the flow of high pressure deflecting fluid is needed only momentarily. As soon as the primary flow stream is deflected, the high pressure deflecting stream can be discontinued. With most conventional bi-directional fluid flow control valves there is an additional feedback flow through the off leg which assists in keeping the primary flow in the selected branch conduit or leg. Under normal ambient pressures the pressure outside the control valve will be greater than the pressure in the off leg. As a result, fluid will flow into the off output, into the off leg and against the side of the primary flow stream opposite that having the low pressure vortex bubble to produce the additional feedback flow.

The conventional valve thus far described will be quite stable under normal ambient pressures. However, the conventional valve is not stable at quite low ambient pressures or at the zero ambient pressure existing in outer space. The primary flow stream of the conventional valve will split between the branch conduits, rather than remain in the selected branch conduit, when the ambient pressure is reduced to zero. This happens because the off output, and the off leg, are open to the zero ambient pressure so that the pressure on the off side of the primary flow stream will be lower than even the low pressure in the vortex bubble on the opposite side of the primary flow stream. As a result, the primary flow stream splits between the two branch conduits.

It is a primary object of the present invention to positively seal the off output with a ball check valve so that the ambient pressure cannot affect the stability of position of the primary flow stream within the valve housing. The flow stream will stay in the selected leg regardless of the ambient pressure, or lack of ambient pressure.

In a preferred form of the present invention, the ball check valve is mounted in a cylindrical bore between the two outputs, and there is enough clearance between the ball valve and the cylindrical bore to produce a positive feedback flow through the off leg. This aids in stabilizing the flow stream position. The clearance is small enough to maintain a differential pressure across the ball check valve and the off output. This differential pressure keeps the ball check valve seated until the control means are actuated to deflect the primary flow stream from the on output to the off output. A bi-directional fluid flow control valve having these structural features and effective to function in the manner described constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles.

In the drawings:

FIGURE 1 is a schematic plan view of a bi-directional fluid flow control valve constructed in accordance with one embodiment of the present invention; and FIGURE 2 is a schematic plan view of a modified control means for deflecting the primary flow stream in the valve shown in FIGURE 1.

A bi-directional fluid flow control valve constructed in accordance with one embodiment of the present invention is indicated generally by the reference numeral 11 in FIGURE 1.

The valve 11 includes a valve housing 12, a primary flow conduit 13, two outputs 14 and 16, and two branch conduits, or legs, 17 and 18 connecting the output with the primary flow conduit.

A floating ball check valve 19 is mounted for movement within a cylindrical bore 21 in the valve housing. The ball check valve 19 rests on an annular seating surface 22 to seal the output 16. The ball check valve 19 engages a similar annular seating surface 23 to seal the output 14.

The control means for deflecting the primary flow stream from one branch conduit or leg to the other branch conduit or leg include a pair of primary switching solenoids 24 and 26. The solenoids are located in control conduits 27 and 28. These conduits open at one end to the primary flow conduit 13 and are connected at their other ends to a source of pressurized fluid (not shown in the drawings).

In the operation of the control valve shown in FIGURE 1 the source of pressurized fluid is connected to the primary flow conduit 13 to produce a primary flow as indicated by the arrows PF. The primary flow is directed to the desired branch conduit or leg by momentary actuation of the solenoid 24 or 26. In the mode of operation shown in FIGURE 1, the solenoid 26 would have been opened momentarily to deflect the primary flow to the left branch conduit 17. Thus, the branch conduit 17 and output 14 would be the on leg and on output and the branch conduit 18 and output 16 would be the off leg and off output.

As soon as the primary flow stream PF is deflected to the leg 17 a low pressure vortex bubble VB is formed as illustrated in FIGURE 1. This low pressure vortex bubble, in combination with the higher pressure existing in the off leg (as will be described in greater detail below), keeps the primary flow stream deflected into the on leg 17, and the flow of deflecting fluid from the control conduit 28 is no longer needed. Thus, the solenoids 24 and 26 need be actuated only momentarily to deflect the primary flow stream in the direction desired.

The ball check valve 19 floats in the cylindrical bore 21 with a small amount of clearance 29. This small amount of clearance produces a pressure differential between the pressure $P_1$ existing near the on output and the pressure $P_2$ existing in the off leg. The clearance is large enough to produce a positive pressure $P_2$ in the off leg which is always greater than the low pressure in the vortex bubble VB. As a result the pressure $P_2$ produces a positive feedback flow FF which helps keep the primary flow stabilized in the on leg selected. This positive feedback flow is derived from the primary flow and is not dependent in any manner on the ambient pressure $P_0$ existing outside the off output.

The pressure differential between the pressure $P_1$ within the valve 11 near the on output and the ambient pressure $P_0$ acting across that area of the ball check valve 19 covering the off output serves to keep the ball check valve 19 positively seated on the valve seat 22. As a result, the ambient pressure $P_0$ can have no effect on the flow conditions within the valve 11. The primary flow will therefore stay in the selected leg even though the ambient pressure drops to zero, as happens in outer space.

The valve construction illustrated in FIGURE 1 as described above simplifies the design of a bi-directional fluid ball control valve, since it minimizes geometrical and tolerance problems. The valve 11 of the present invention will perform over a wide range of source pressures, for example, a range of 100 to 1,000 p.s.i.a., and will be stable over this range because of the manner in which the clearance 29 provides the feedback assist through the off leg.

FIGURE 2 shows a modified control means for the valve 11. In the modification shown in FIGURE 2, the solenoids 24 and 26 serve to pull the flow stream in the direction desired as in the form of the invention shown in FIGURE 1. The solenoids 24 and 26 open the conduits 27 and 28 to ambient pressure to vent the pressure and thus to deflect the flow stream in the direction desired.

What is claimed is:

1. A bi-directional fluidic flow control valve comprising, a valve housing having a primary flow conduit, two outputs, and two branch conduits connecting the outputs with the primary flow conduit, control means for deflecting the primary flow stream from one branch conduit and related output to the other branch conduit and related output, and a floating ball check valve mounted in a cylindrical bore in the valve housing for movement between the two outputs and dimensioned to move from a fluid sealing seat on one output to a fluid sealing seat on the other output in response to the pressure differential produced in the valve housing when the control means are actuated to deflect the primary flow stream to one output from the other output, and wherein there is sufficient clearance between the ball check valve and the cylindrical bore to produce a positive feedback flow through the off branch conduit which adds to the flow stream position stability, whereby the ball check valve positively seals the off output to prevent low ambient pressure from affecting the stability of position of the flow stream in the valve housing.

2. A bi-directional valve as defined in claim 1 wherein the clearance is small enough to maintain a large enough differential pressure across the ball check valve and the off output to maintain the ball check valve seated on the seat of the off output until the control means are actuated to deflect the primary flow stream from the on output to the off output.

References Cited
UNITED STATES PATENTS

| | | | |
|---|---|---|---|
| 3,001,539 | 9/1961 | Horvitz | 137—81.5 |
| 3,124,999 | 3/1964 | Woodward | 137—81.5 X |
| 3,151,623 | 10/1964 | Riordan | 137—112 |
| 3,420,255 | 1/1969 | Wilkerson | 137—81.5 |

M. CARY NELSON, Primary Examiner

WILLIAM R. CLINE, Assistant Examiner